United States Patent
Middleman

(10) Patent No.: US 9,223,824 B1
(45) Date of Patent: *Dec. 29, 2015

(54) SYSTEMS AND METHODS FOR SCRUBBING CONFIDENTIAL INSURANCE ACCOUNT DATA

(71) Applicant: STATE FARM MUTUAL AUTOMOBILE INSURANCE COMPANY, Bloomington, IL (US)

(72) Inventor: Paul Middleman, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,454

(22) Filed: Mar. 10, 2015

Related U.S. Application Data

(63) Continuation of application No. 14/496,981, filed on Sep. 25, 2014.

(51) Int. Cl.
| | | |
|---|---|---|
| *H04L 29/06* | (2006.01) | |
| *G06F 17/30* | (2006.01) | |
| *G06F 21/60* | (2013.01) | |
| *H04L 9/06* | (2006.01) | |

(52) U.S. Cl.
CPC ........ *G06F 17/30371* (2013.01); *G06F 21/602* (2013.01); *H04L 9/06* (2013.01)

(58) Field of Classification Search
None
See application file for complete search history.

(56) References Cited

U.S. PATENT DOCUMENTS

| | | | | |
|---|---|---|---|---|
| 6,289,455 | B1 * | 9/2001 | Kocher et al. | 713/194 |
| 6,714,943 | B1 * | 3/2004 | Ganesh | G06F 17/3051 |
| | | | | 707/999.002 |
| 8,495,384 | B1 * | 7/2013 | DeLuccia | H04L 63/1433 |
| | | | | 713/189 |
| 8,533,844 | B2 * | 9/2013 | Mahaffey | G06F 21/564 |
| | | | | 709/203 |
| 8,555,397 | B2 * | 10/2013 | Winkler | 726/26 |
| 8,640,191 | B2 * | 1/2014 | Lim | G06F 21/6218 |
| | | | | 713/153 |
| 8,826,443 | B1 * | 9/2014 | Raman et al. | 726/26 |
| 2003/0140027 | A1 * | 7/2003 | Huttel et al. | 707/1 |
| 2004/0181670 | A1 * | 9/2004 | Thune et al. | 713/176 |

(Continued)

OTHER PUBLICATIONS

Nguyen-Tuong, Anh; Evans, David; Knight, John C.; Cox, Benjamin; Davidson, Jack W. Security through Redundant Data Diversity. IEEE International Conference on Dependable Systems and Networks With FTCS and DCC. Pub. Date: 2008. Relevant pp. 187-196. http://ieeexplore.ieee.org/stamp/stamp.jsp?tp=&arnumber=4630087.*

(Continued)

*Primary Examiner* — Jeremiah Avery
(74) *Attorney, Agent, or Firm* — Marshall, Gerstein & Borun LLP; Randall G. Rueth

(57) ABSTRACT

Methods and systems for scrubbing confidential insurance account information are provided. According to embodiments, a scrubbing server can receive a request to scrub confidential insurance data that includes the contents of an insurance account information database and an indication of the category of confidential data stored in the database. The scrubbing server can scrub the valid data contained in the received database, replacing confidential information with "scrambled" data that is not confidential. The scrubbing server can transmit the contents of the scrubbed database back to the requesting party.

20 Claims, 5 Drawing Sheets

(56) References Cited

U.S. PATENT DOCUMENTS

| | | | |
|---|---|---|---|
| 2008/0222734 A1* | 9/2008 | Redlich | G06F 21/577 726/26 |
| 2010/0211415 A1* | 8/2010 | Tholl | G06Q 40/08 705/4 |
| 2012/0078847 A1* | 3/2012 | Bryant | G06F 17/30575 707/647 |
| 2012/0159637 A1* | 6/2012 | Dove | G06F 21/6254 726/26 |
| 2014/0082753 A1* | 3/2014 | Sarferaz | G06Q 10/06 726/30 |

OTHER PUBLICATIONS

Jinghui, Gao; Zijing, Jiang; Jia, Liu. Maintaining Caching Consistency for Heterogeneous Database Systems. 2010 3rd International Conference on Advanced Computer Theory and Engineering (ICACTE), vol. 6. http://ieeexplore.ieee.org/stamp/stamp.jsp?tp=&arnumber=5579195.*

* cited by examiner

SYSTEMS AND METHODS FOR SCRUBBING CONFIDENTIAL INSURANCE ACCOUNT DATA

CROSS-REFERENCE TO RELATED APPLICATIONS

This application is a continuation of U.S. Nonprovisional patent application Ser. No. 14/496,981, filed Sep. 25, 2014, and entitled "Systems and Methods for Scrubbing Confidential Insurance Account Data". Said nonprovisional application is incorporated herein by reference in its entirety.

FIELD OF THE DISCLOSURE

The present disclosure generally relates to protecting confidential insurance account information, more particularly, to systems and methods for utilizing a scrubbing algorithm to scrub confidential insurance account data from a database.

BACKGROUND

Insurance providers have a need to analyze large databases of insurance account data to develop tools and services that accompany insurance products. Many types of insurance account data is confidential (e.g. social security numbers) and cannot be shared easily with third parties. For example, an insurance company may ask a developer to create a program that presents an easy-to-view dashboard of important customer account information for when a customer calls the insurance company. The insurance company may be unable to share the confidential insurance account data with the developer to assist in the program's development. The developer needs a test database in the same format as a real customer database to accurately troubleshoot issues that arise during development. Hence, there is a need to be able to scrub a database of confidential insurance account information while preserving the format of the data.

Past systems that perform this task are slow at handling the volume of records a typical insurance company stores. Further, these past systems cannot guarantee that the output of the scrubbing tool provides a unique output for each data field scrubbed. Many types of confidential insurance account data are unique to the particular customer and duplicate results can cause unexpected problems when developing tools that interact with confidential insurance account data.

Accordingly, there is an opportunity to create a scrubbing algorithm that can quickly scrub a database of confidential information and ensure that the resulting database contains no duplicate entries.

SUMMARY

In one aspect, a computer-implemented method of scrubbing confidential insurance account data may be provided. The method may comprise (1) receiving, via a computer network, a request to scrub data containing (i) contents of a first database of confidential insurance account data and (ii) an indication of a category of data contained in the contents of the first database; (2) verifying, by one or more processors, the contents of the first database are valid based on the indication of the category of data contained in the contents of the first database; (3) scrubbing, by the one or more processors, only the valid data contained in the contents of the first database using a scrubbing algorithm associated with the indicated category of data to generate a second database that contains no confidential data, wherein scrubbing causes each non-identical data value in the first database to be transformed to a unique value in the second database; and (4) transmitting, via the computer network, the contents of the second database.

In another aspect, a system for scrubbing confidential insurance account data may be provided. The system may comprise a communication module adapted to receive the contents of a database containing confidential insurance account data; a memory adapted to store non-transitory computer executable instructions; and one or more processors adapted to interface with the communication module. The one or more processors may be configured to execute the non-transitory computer executable instructions to cause the one or more processors to (1) receive, via the communication module, a request to scrub data containing (i) contents of a first database of confidential insurance account data and (ii) an indication of a category of data contained in the contents of the first database; (2) verify, by one or more processors, the contents of the first database are valid based on the indication of the category of data contained in the first database; (3) scrub, by the one or more processors, only the valid data contained in the contents of the first database using a scrubbing algorithm associated with the indicated category of data to generate a second database that contains no confidential data, wherein scrubbing causes each non-identical data value in the first database to be transformed to a unique value in the second database; and (4) transmit, via the communication module, the contents of the second database.

In still another aspect, a non-transitory computer-readable storage medium storing processor-executable instructions may be provided. When executed, the instructions may cause one or more processors to (1) receive, via a computer network, a request to scrub data containing (i) contents of a first database of confidential insurance account data and (ii) an indication of the category of data contained in the contents of the first database; (2) verify, by one or more processors, the contents of the first database are valid based on the indication of the category of data contained in the first database; (3) scrub, by the one or more processors, only the valid data contained in the contents of the first database using a scrubbing algorithm associated with the indicated category of data to generate a second database that contains no confidential data, wherein scrubbing causes each non-identical data value in the first database to be transformed to a unique value in the second database; and (4) transmit, via the computer network, the contents of the second database.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
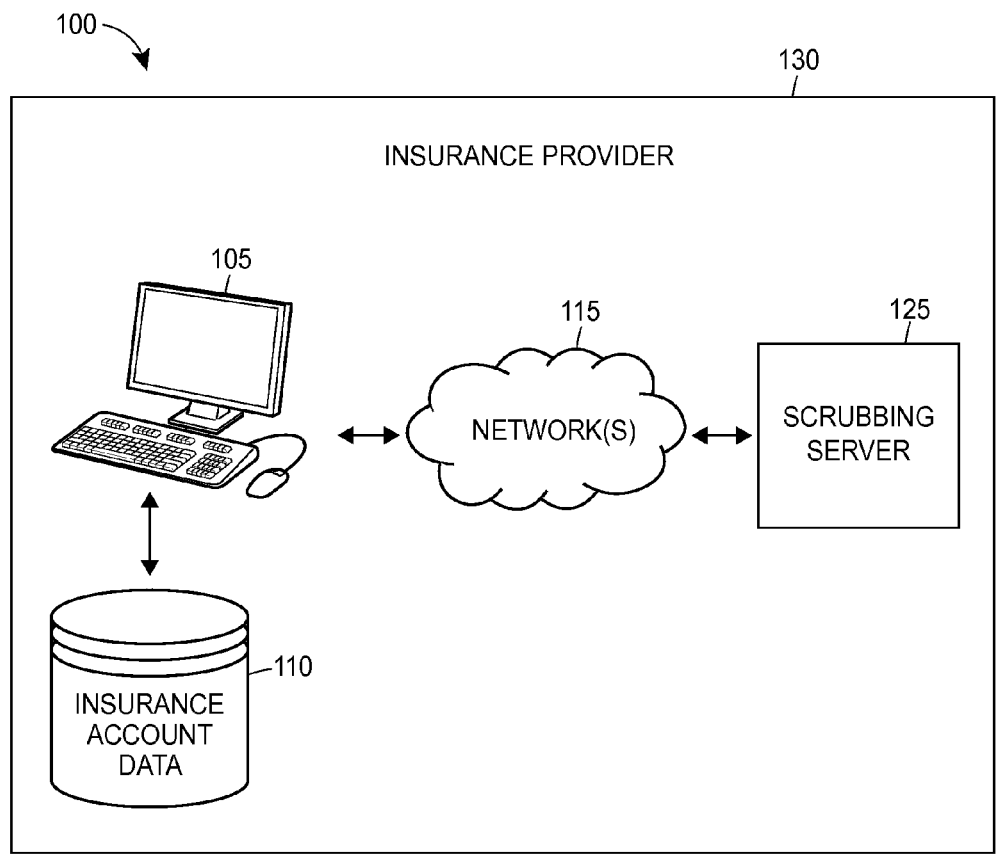
FIG. 1 depicts an example environment including components and entities associated with scrubbing confidential insurance account data in accordance with some embodiments.

The novel methods and systems disclosed herein generally relate to scrubbing confidential insurance account data from a database while preserving the format of the original database. According to embodiments, a scrubbing server can receive the contents of a database containing confidential insurance account data and an indication of the type of data stored in the received database. Taking into account the category of information contained in the database, the scrubbing server can scrub the database using an algorithm (such as a Feistel cipher) associated with the category of information, producing a second database in the same format as the first database, in which all of the confidential data scrubbed. The contents of the second database containing scrubbed insurance data may, subsequently, be transmitted back to the user.

The scrubbing of confidential insurance data using a Feistel cipher and other similar algorithms are quick ways to create a database that developers can integrate into their test environments. The speed of these algorithms allow for the rapid creation of a test database, allowing the insurance provider to reduce the development time, and thus the costs, in developing tools. Further, using these algorithms guarantee that each entry in the second database of scrubbed insurance account data is unique, preventing any unnecessary delays in development due to troubleshooting an issue artificially introduced by duplicate entries that would not exist in a database containing actual insurance account data. As a result, the savings on development expenses may be passed on to consumers and insurance participation may increase due to the ability to develop better tools more quickly.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Exemplary Environment for Scrubbing Confidential Insurance Account Information

FIG. 1 depicts an example environment 100 associated with scrubbing confidential insurance account information. Although FIG. 1. depicts certain entities and components, it should be appreciated that additional or alternate entities and components are envisioned.

As shown in FIG. 1 the environment contains an example user device 105 which may be a computer, a laptop, a PDA, a mobile phone, a tablet or any other electronic computing device. The user device 105 may be coupled to a database 110 of insurance account information. In embodiments, the database 110 can include any type of storage capable of storing data such as insurance account information. For example, the database 110 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Although the user device 105 and database 110 are depicted as single entities, it should be appreciated that any number of user devices and databases are envisioned. For example, each user device may be coupled with one database in a one-to-one relationship, all user devices may be coupled to the same database, or any other mapping of any number of user devices to any number of databases.

According to embodiments, the user device 105 is capable of generating, maintaining, and transmitting the contents of the database 110. The database 110 may store both confidential and non-confidential data. For example, the insurance account information may include confidential information, such as, driver's license numbers, health policy numbers, bank routing numbers, social security numbers, Canadian social insurance numbers, financial account numbers, dates, or any other confidential information associated with a policyholder, and the insurance account information may include information that is not confidential, such as, the policyholder's name, address, vehicle ownership data, and other non-confidential insurance account information. Each category of confidential information may also be associated with a corresponding scrubbing algorithm. For example, health policy numbers may be associated with a Feistel cipher, whereas dates are associated with a date-shifting algorithm. Although FIG. 1 depicts the user device 105 and the database 110 as internal to the insurance provider 130, embodiments in which the user device 105 and the database 110 are external to the insurance provider are envisioned (e.g. at an affiliated insurance provider).

The user device 105 may be configured to communicate with a scrubbing server 125 via a network 115, such as, for example, a wide area network (WAN), a local area network (LAN), a personal area network (PAN), or other networks. The network 115 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). Although FIG. 1 depicts the insurance provider 130, it should be appreciated that other entities that need to scrub confidential account information are envisioned (e.g. a credit rating agency, an identity theft protection agency, or other companies aggregating confidential account information). According to embodiments, the scrubbing server 125 can be any combination of hardware and software modules. For example, the scrubbing server 125 may contain a software module for a scrubbing routine and a memory to store the properties associated with each category of information (e.g., format, scrubbing algorithm). Although FIG. 1 depicts the scrubbing server 125 as a part of the insurance provider 130, it should be appreciated that the scrubbing server 125 may be separate from (and connected to or accessible by) the insurance provider 130.

The components of the environment 100 can implement the systems and methods that scrub confidential insurance account data. Although "confidential" is used to describe the data that is scrubbed by the scrubbing server, it should be appreciated that the user may request that the scrubbing server scrubs non-confidential as well. Accordingly, in these embodiments, "confidential" refers to both the confidential data and requested non-confidential data that the user requested to be scrubbed, collectively. According to embodiments, the user device 105 can create and maintain the database 110 that stores insurance account information. In order to scrub the database of confidential insurance account information, the user device 105 may transmit a request to scrub the contents of the database 110, via the network 115, to the scrubbing server 125. The request may include the contents of the database 110 stored as a "flat file" (i.e. a human-readable comma-delineated list) or as an XML file. The request may further include an indication of the category of confidential data is stored in the database 110 (e.g. driver's license numbers or financial account numbers). In some embodiments, if no indication of the category of confidential data is provided, a default category associated with a default scrubbing algorithm may be inferred.

The request may further include a field (an entry in a delineated list) and/or a column (a position in a field) in the database 110 that the confidential insurance account information that will be scrubbed is located. For example, if the database contains the data set {12345, 67890}, field 0 is "12345", while column 2 of field 1 is "8." The request may also include multiple categories and/or multiple field/column locations. For example, the request may indicate that social security numbers are in field 0 and bank routing numbers are in field 1. In some embodiments, the user may request a field to scrub by using a textual description of the data stored in a particular field. For example, a user may transmit a request to scrub the field "SSN." In response, the scrubbing server may scrub fields that store data in the format of a social security number (e.g., 123-45-6789).

According to embodiments, the scrubbing server 125 may store the contents of the flat file (or XML file) in a temporary database (not depicted). The scrubbing server 125 can scrub the confidential insurance account information stored in the temporary database. If field/column indications are provided, only the indicated segments of the temporary database will be scrubbed. If no field/column indications are provided, the whole temporary database may be scrubbed. Additionally, the scrubbing server 125 may scrub only data that is verified to be in the correct format based on the indicated category of data. For example, driver's license numbers consisting of only identical numbers, or social security numbers with fewer or more than nine digits are not in valid formats and will not be scrubbed. Some categories of financial account information may require scrubbing only a subset of the confidential information. For example, leading zeros in a financial account number may not need to be scrubbed; as such, for example, for the financial account number 00012345, only the 12345 will be scrubbed. Although the above examples scrub only numeric data, it is envisioned that the scrubbing server may scrub confidential textual data as well. By scrubbing only user-defined segments of the temporary database and subsequently not scrubbing the invalid data or the unnecessary parts of a data entry contained therein, there may be a reduction in the time it takes for the scrubbing algorithm to completely scrub the confidential insurance account data stored in the temporary database.

According to embodiments, the scrubbing server 125 may process the contents of temporary database sequentially. In some embodiments, the scrubbing server 125 may begin with the first entry in the temporary database. In other embodiments, the scrubbing server 125 may begin with the first indicated field/column as indicated in the request. Of course, there may be scenarios where the first entry processed is located at both the first entry in the temporary database and the first field/column indicated in the request. If the scrubbing server 125 determines a data entry is valid based on the indicated category of data, then that data entry may be processed by the scrubbing routine. The scrubbing routine may scrub the data according to the scrubbing algorithm associated with the category of data. For example, social security numbers may be scrubbed using a Feistel cipher, whereas dates may be scrubbed using a date-shifting algorithm. After the data entry is processed by the scrubbing routine, the output may overwrite the original value in the temporary database. Conversely, if the scrubbing server 125 determines that a data entry is invalid, the scrubbing server 125 may proceed to the next data entry without scrubbing the current entry.

After scrubbing the contents of the database 110, the scrubbing server 125 may transmit the contents of the temporary database, via the network 115 back to the user device 105. The data may again be transmitted in the form of a "flat file" or an XML file. The insurance provider 130 may then provide the transmitted data to a party that could not view the confidential data originally stored in the database 110. That party is able to load the transmitted data into a test environment to develop tools that interact with the confidential insurance account information stored in database 110. It should be appreciated the contents of the original database 110 may be unchanged to allow the insurance provider 130 to continue to maintain a record of all of the confidential insurance account information according to normal practices.

Exemplary Scrubbing Algorithms

Figure 2:
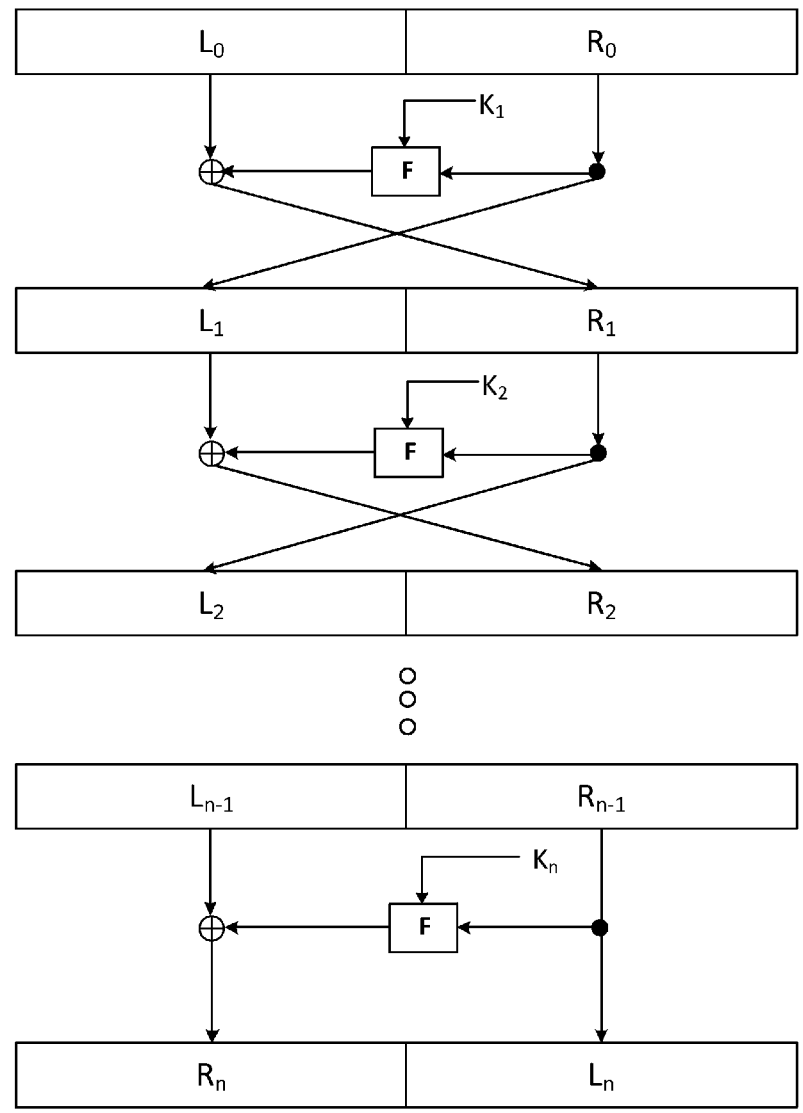
FIG. 2 depicts a ladder diagram of an implementation of a Feistel cipher that scrubs confidential insurance account data in accordance with some embodiments.

With reference to FIG. 2 and in accordance with some embodiments, an example format of a Feistel cipher used to "scramble" data in a scrubbing algorithm is depicted. As used herein, "scramble" means to replace the value of a data entry with a new value, in the same format as the original value, such that a person cannot learn the confidential value without reversing the Feistel cipher. A Feistel cipher is described in the *Handbook of Applied Cryptography* by A. Menezes, P. van Oorschot, and S. Vanstone, CRC Press, 1996, and is hereby incorporated by reference. The Feistel cipher operates by segmenting the data into blocks of n bits, where n is typically 64, but other values may be used (e.g., 128). The n bits are then divided into two halves such that the first half of the n bits are $L_0$ and the second half of the n bits are $R_0$. The cipher then performs r steps to "scramble" the data, where r is typically 16, but other values may also be used. The algorithm proceeds for the r steps such that:

for $1 \leq i \leq r$:
$L_i = R_{i-1}$; and
$R_i = L_{i-1} \text{ XOR } f(R_{i-1}, K_i)$ where $f$ is a function the "scrambles" the inputs and K is a private key containing r subkeys.

The function $f$ is chosen such that a dataset containing only unique entries (e.g. a list of social security numbers) will have a unique output for each entry. The function $f$ is also chosen such that without knowledge of the private key K, it is very difficult to determine the contents of the original data. One such function that meets this requirement is the Data Encryption Standard (DES); however there are several other functions that also meet these requirements, such as triple DES, Fast Data Encipherment Algorithm (FEAL), RC5, or ICE. Steps detailing how the DES function works are also detailed in the *Handbook of Applied Cryptography.*

Additionally, some categories of data may be scrubbed using methods other than a Feistel cipher. For example, a date may be scrubbed by changing the day a given number of days forwards or backwards in time. As an example, a database containing the data set of dates {01/05, 07/21} may be scrubbed by advancing both dates 15 days, resulting in the scrubbed data set {01/20, 08/05}. In some embodiments, the scrubbing algorithm may receive a request to scrub a category of information using a user-defined category of confidential data. In such embodiments, the user-defined scrubbing algorithm may be utilized to scrub the corresponding data.

Exemplary Method of Scrubbing Confidential Insurance Account Data

Figure 3:
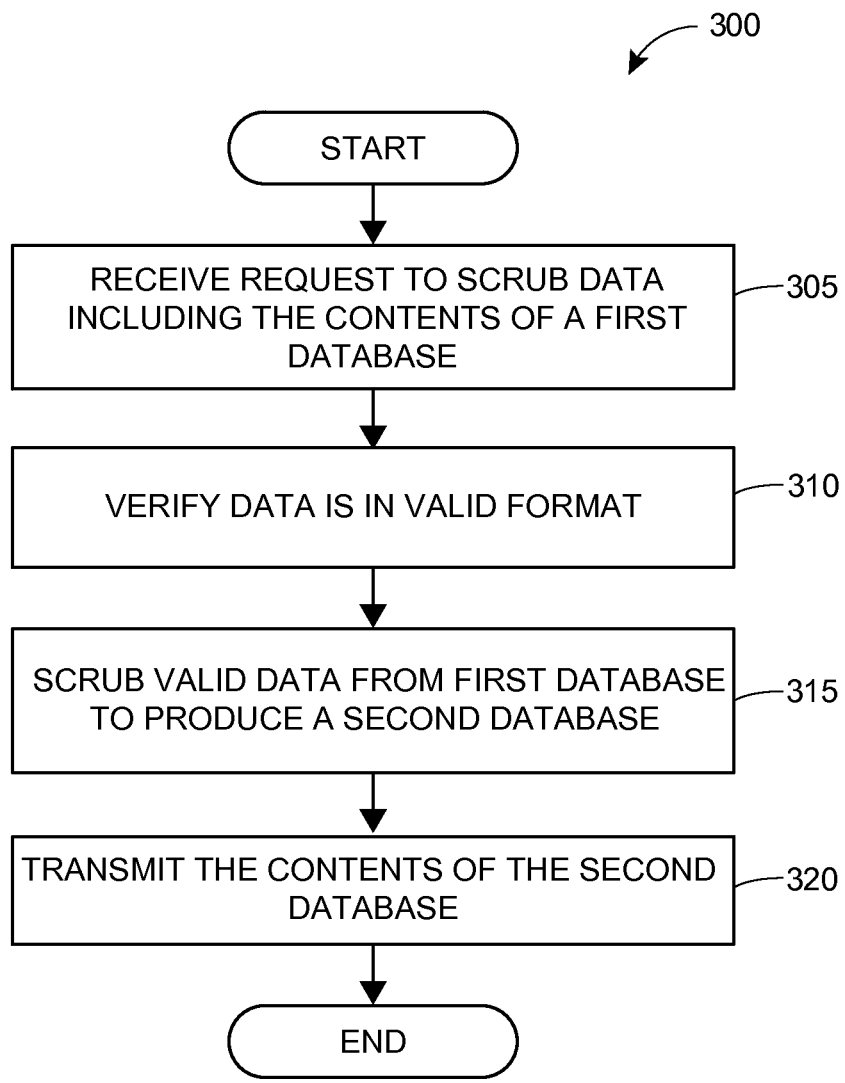
FIG. 3 depicts a flow diagram of scrubbing confidential insurance account information in accordance with some embodiments.

FIG. 3 is an example method 300 for scrubbing confidential insurance account data. At least a portion of the method 300 may be performed by one or more computing devices. For example, the method 300 may be performed by a server such as the scrubbing server 125 as described with respect to FIG. 1.

The computing device can receive (block 305) a request from a user device to scrub confidential insurance account data. The request may include the contents of a first database that stores confidential data supplemented by indications of the category of confidential information contained in the database. Further, the computing device can receive the request to scrub confidential insurance account data via a network, such as a LAN or an intranet. After receiving the request, the computing device can store the contents of the first database in a second database that will be scrubbed. The computing device can then verify (block 310) that the contents of the second database are in the correct format based on the indication of the category of the confidential information. For example, the last digit of a Canadian Social Insurance Number is a checksum; if the checksum is incorrect, the data entry is invalid. In some embodiments, invalid data contained in the first database will not be scrubbed.

The computing device can scrub (block 315) the valid confidential insurance data contained in the second database. In some embodiments, scrubbing may consist of passing the data through the corresponding scrubbing algorithm associated with the category of information, such as a Feistel cipher that implements a DES algorithm or a date-shifting algorithm. The corresponding scrubbing algorithm "scrambles" the data such that the resulting contents of the data entry are not easily traceable back to the original contents. After scrubbing all the valid confidential data, the computing device can transmit (block 320) the contents of the second database to the user device that sent the original request. In other embodiments, the computing device can transmit the contents of the second database to a different device than which sent the original request. In some embodiments, the contents of the second database may later be used to test and develop programs that interact with confidential insurance account information.

Exemplary User Interface

In some embodiments, a user device (such as user device 105 as discussed with respect to FIG. 1) may provide an interface 400 that enables a user to define custom categories of confidential information. The interface 400 may enable the user to define characteristics associated with the custom category, such as the name of the category 405 ("ZIP code") and the length of a data entry associated with the category 410 ("5"). The interface 400 may also enable the user to define the format for a data entry associated with the category 415 ("NNNNN"). In the depicted example, "N" is used to represent that a number should be in a particular position of a data entry. Similarly, "L" may be used to represent a letter should be in the particular position of a data entry. In some embodiments, special characters (such as "-" or "/") may represent that the entered special character should be in the particular position of a data entry.

Figure 4:
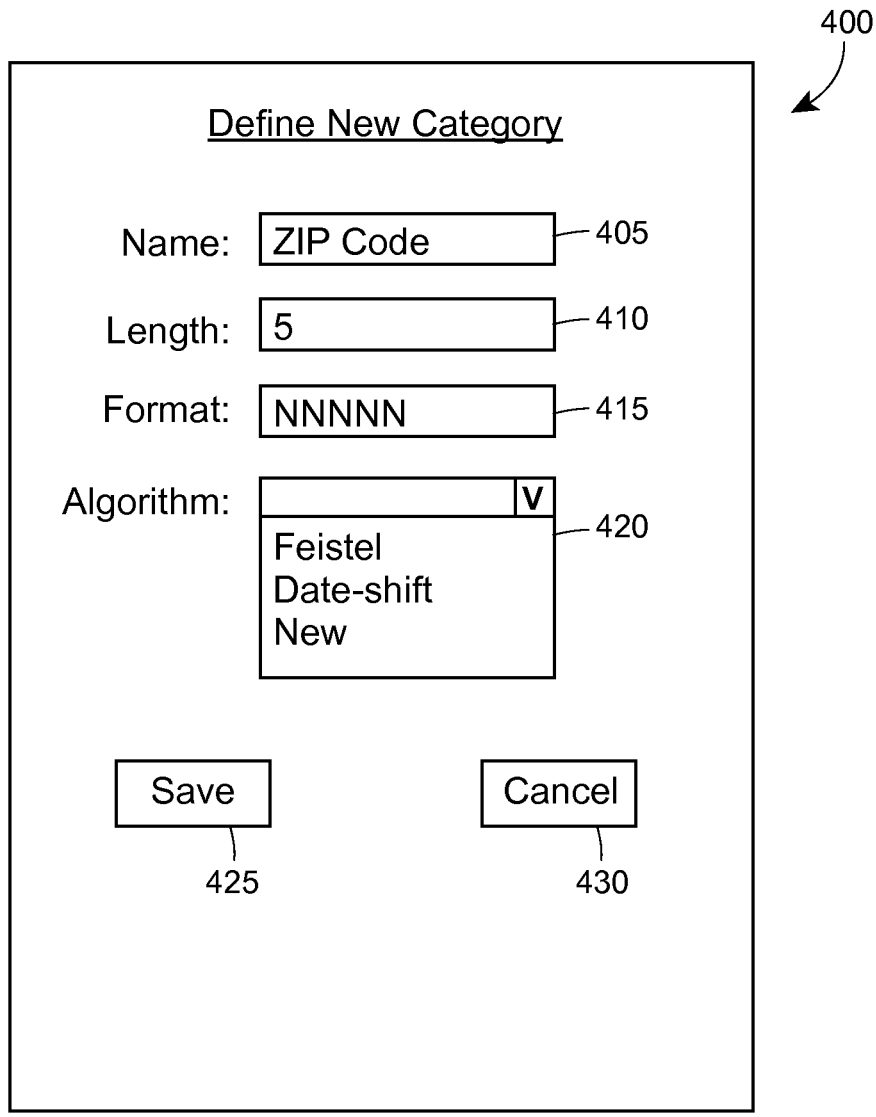
FIG. 4 depicts an exemplary interface for defining a new category of information in accordance with some embodiments.

Further, the interface 400 may enable the user to choose which scrubbing algorithm to utilize when the scrubbing server scrubs data associated with the category 420. The choice of scrubbing algorithm 420 may be implemented as a drop down menu or any other method of enabling a user to select one of multiple options. The drop down menu may contain already defined algorithms ("Feistel" and "Date-shift") as well as an option that enables the user to define a new algorithm ("New"). In some embodiments, if the user selects "New" as the algorithm, the user device may present another interface that enables the user to define the new algorithm. Subsequently, the newly defined algorithm may appear in the drop down menu when defining future new categories. Similarly, in some embodiments, if the user selects an already defined algorithm, the user device may present another interface that enables the user to define specific parameters associated with that algorithm (e.g., the number of bits in the Feistel cipher, the numbers of days shifted). Although FIG. 4 depicts fields 405-420, additional, fewer, or alternative fields are also envisioned.

According to present embodiments, the interface 400 may also provide the soft button 425 ("SAVE") and the soft button 430 ("CANCEL"). In response to the user selecting the soft button 425, the user device may add the defined characteristics of the new category to a memory that stores the characteristics of known categories of information. Subsequently, the entered information associated with the new category may be transmitted, via a communication network, to a scrubbing server (such as scrubbing server 125 as discussed with respect to FIG. 1) to be stored in a memory. In response to the user selecting the soft button 430, the user device exit interface 400 without saving the new category to the memory.

It should be appreciated that the interface 400 may also be provided by a scrubbing server. Although interface 400 is depicted as an interactive form, other types of interfaces that enable a user to define a new category of information are also envisioned.

Exemplary Scrubbing Server

Figure 5:
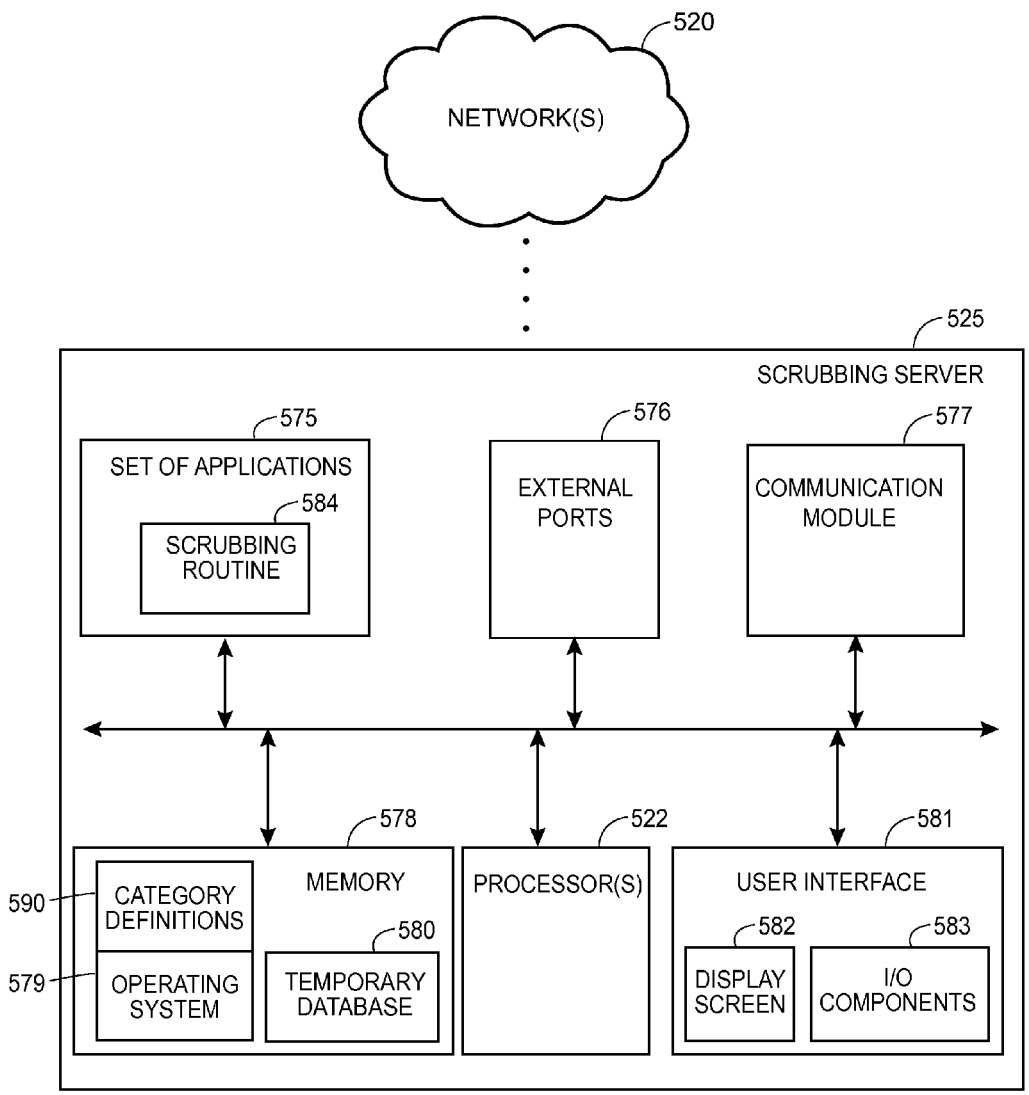
FIG. 5 is a block diagram of a scrubbing server in accordance with some embodiments.

FIG. 5 illustrates a diagram of an exemplary scrubbing server 525 (such as the scrubbing server 125 as discussed with respect to FIG. 1) in which the functionalities as discussed herein may be implemented. It should be appreciated that the scrubbing server 525 may be associated with an insurance provider, as discussed herein.

The scrubbing server 525 may include one or more processors 522 as well as a memory 578. The memory 578 may store an operating system 579 capable of facilitating the functionalities as described herein. The scrubbing server 525 may also store a set of applications 475 (e.g. machine readable instructions). For example, one of the set of applications 575 may be a scrubbing routine 584 configured to "scramble" confidential insurance account information. It should be appreciated that other applications are envisioned.

The one or more processors 522 may interface with the memory 578 to execute the operating system 579 (e.g., Microsoft Windows®, Linux®, IBM AIX®, etc.) and the set of applications 575. According to some embodiments, the memory 578 may also include a list of category definitions 590 and a temporary database 580 to store contents of a database received at the communication module 577. The scrubbing routine 584 may access the temporary database 580 and category definitions 590 to scrub the confidential information contained in the temporary database 580. The output of the scrubbing routine 584 may overwrite confidential data stored in the temporary database 580 with the scrubbed version of the data determined by the scrubbing routine 584. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The scrubbing server 525 may further include a communication module 577 configured to communicate data via one or more networks 520. According to some embodiments, the communication module 577 can include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may receive, via the network 520, a request to scrub confidential insurance account data and the contents of a database. As another example, the communication module may transmit the contents of the temporary database 580 after the scrubbing routine 584 has finished scrubbing the contents of the temporary database 580. The scrubbing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to the present embodiments, the user may access the scrubbing server 525 via the user interface 581 to process update the operating system 579 and/or perform other functions. In some embodiments, the scrubbing server 525 may perform the functionalities as discussed herein as part of a "cloud" network or can otherwise communicate with other hardware or software components within the cloud to send, retrieve, or otherwise analyze data.

The scrubbing server 525 may be a local or remote server. For instance, the scrubbing server 525 may be a remote server, such as a remote located server associated with the insurance provider. Additionally or alternatively, the scrubbing server 525 may be located at a third party.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method, the method comprising:
   receiving, at a scrubbing server, from a user device, and via a computer network, a request to scrub data containing (i) contents of a first database of confidential insurance account data and (ii) an indication of a category of data contained in the contents of the first database;
   verifying, by one or more processors, that the contents of the first database are valid based on the indication of the category of data contained in the contents of the first database;
   for each valid data contained in contents of the first database, scrubbing, by the one or more processors, the valid data using a scrubbing algorithm associated with the indicated category of data to generate a second database that contains no confidential data, wherein scrubbing i) causes each non-identical data value in the first database to be transformed to a unique value in the second database and ii) while preserving formatting, replaces confidential data contained in the contents of the first database with data that is not confidential;
   transmitting, from the scrubbing server, to the user device, and via the computer network, contents of the second database.

2. The computer-implemented method of claim 1, further comprising:
   corresponding a first set of valid data in the contents of the first database to a category of data associated with a scrubbing algorithm comprising a Feistel cipher.

3. The computer-implemented method of claim 2, wherein corresponding a first set of valid data to a category of data associated with the scrubbing algorithm comprising the Feistel cipher further comprises:

corresponding a first set of valid data to a category of data associated with the scrubbing algorithm comprising the Feistel cipher that incorporates a Data Encryption Standard (DES) function.

4. The computer-implemented method of claim 1, wherein a second set of valid data in the contents of the first database corresponds to a category of data associated with a scrubbing algorithm comprising at least one of:
   a date-shifting algorithm or a user-defined algorithm.

5. The computer-implemented method of claim 1, wherein the indication of a category of data contained in the contents of the first database comprises:
   an indication that the contents of the first database contains categories of data that correspond to at least one of driver's license numbers, health policy numbers, bank routing numbers, social security numbers, Canadian social insurance numbers, financial account numbers, or user-defined categories of data.

6. The computer-implemented method of claim 5, wherein each category of information is associated with a scrubbing algorithm that will be executed when the category is indicated by the indication of a category of data contained in the contents of the first database.

7. The computer-implemented method of claim 1, wherein verifying the contents of the first database is valid comprises:
   ensuring that the contents of the first database are in the correct format for data belonging to the indicated category of data.

8. The computer-implemented method of claim 7, wherein the contents of the first database that are in an invalid format for data belonging to the indicated category of data are not scrubbed.

9. The computer-implemented method of claim 1, further comprising:
   receiving, at the scrubbing server, from the user device, via the computer network, instructions indicating a subset of the contents of the first database to scrub.

10. The computer-implemented method of claim 8, wherein
   receiving the instructions indicating a subset of the contents of the first database to scrub comprises:
   receiving indications of a field(s) or column(s) in which a particular type of data to be scrubbed is located within the contents of the first database.

11. The computer-implemented method of claim 1, where in the contents of the first and second databases are respectively received and transmitted in a format of at least one of a flat file or a XML file.

12. The computer-implemented method of claim 1, further comprising:
   utilizing the contents of the second database to develop programs that interact with the confidential insurance account data.

13. A system for scrubbing confidential insurance account data, comprising:
   a plurality of transceivers for receiving contents of a database containing confidential insurance account data;
   a memory having non-transitory computer executable instructions stored thereon;
   one or more processors for interfacing with the plurality of transceivers, wherein the one or more processors for executing the non-transitory computer executable instructions to cause the system to:
   receive, from a user device via the plurality of transceivers, a request to scrub data containing (i) contents of a first database of confidential insurance account data and (ii) an indication of a category of data contained in the contents of the first database;
   verify, by one or more processors, that the contents of the first database are valid based on the indication of the category of data contained in the contents of the first database;
   scrub, by the one or more processors, only valid data contained in the contents of the first database using a scrubbing algorithm associated with the indicated category of data to generate a second database that contains no confidential data, wherein scrubbing i) causes each non-identical data value in the first database to be transformed to a unique value in the second database and ii) while preserving formatting, replaces confidential data contained in the contents of the first database with data that is not confidential;
   transmit, to the user device via the plurality of transceivers, contents of the second database.

14. The system of claim 13, wherein executing the non-transitory computer executable instructions further causes the system to:
   correspond a first set of valid data in the contents of the first database to a category of data associated with a scrubbing algorithm comprising a Feistel cipher.

15. The system of claim 14, to correspond a first set of valid data to a category of data associated with the scrubbing algorithm comprising the Feistel cipher, the non-transitory computer executable instructions further cause the system to:
   correspond, via the one or more processors, a first set of valid data to a category of data associated with the scrubbing algorithm comprising the Feistel cipher that incorporates a Data Encryption Standard (DES) function.

16. The system of claim 13, wherein a second set of valid data in the contents of the first database corresponds to a category of data associated with a scrubbing algorithm comprising at least one of:
   a date-shifting algorithm or a user-defined algorithm.

17. The system of claim 13, wherein to verify the data contained in the contents of the first database is valid, the non-transitory computer executable instructions further cause the system to:
   ensure, by the one or more processors, that the data contained in the contents of the first database are in the correct format for data belonging to the indicated category of data.

18. The system of claim 13, wherein executing the non-transitory computer executable instructions further causes the system to:
   receive, via the plurality of transceivers, instructions indicating a subset of data contained in the contents of the first database to scrub.

19. The system of claim 18, wherein to receive the instructions indicating a subset of data contained in the contents of the first database to scrub, the non-transitory computer executable instructions further cause the system to:
   receive, via the plurality of transceivers, indications of the field(s) or column(s) in which a particular type of data to be scrubbed is located, wherein the indication of the field is at least one of a numerical or a textual indication.

20. A non-transitory computer-readable storage medium storing processor-executable instructions, that when executed cause one or more processors to:
   receive, at a scrubbing server, from a user device, and via a computer network, a request to scrub data containing (i) contents of a first database of confidential insurance account data and (ii) an indication of a category of data contained in the contents of the first database;

verify, by one or more processors, that the contents of the first database are valid based on the indication of the category of data contained in the contents of the first database;

for each valid data contained within the contents of the first database, scrub, by the one or more processors, the valid data using a scrubbing algorithm associated with the indicated category of data to generate a second database that contains no confidential data, wherein scrubbing i) causes each non-identical data value in the first database to be transformed to a unique value in the second database and ii) while preserving formatting, replaces confidential data contained in the contents of the first database with data that is not confidential;

transmit, from the scrubbing server, to the user device, and via the computer network, contents of the second database.

\* \* \* \* \*